May 9, 1967 H. R. SHAFFER 3,319,020
HANDLE INTERLOCK FOR ELECTRICAL SWITCHING DEVICES
Filed May 23, 1966 4 Sheets-Sheet 1

INVENTOR.
HOWARD A. SHAFFER
By
OSTROLENK, FABER,
GERB & SOFFEN
ATTORNEYS

May 9, 1967 H. R. SHAFFER 3,319,020
HANDLE INTERLOCK FOR ELECTRICAL SWITCHING DEVICES
Filed May 23, 1966 4 Sheets-Sheet 2
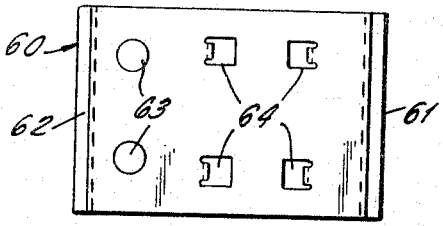
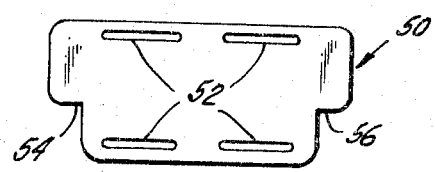
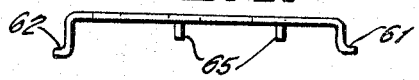
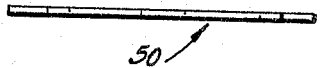
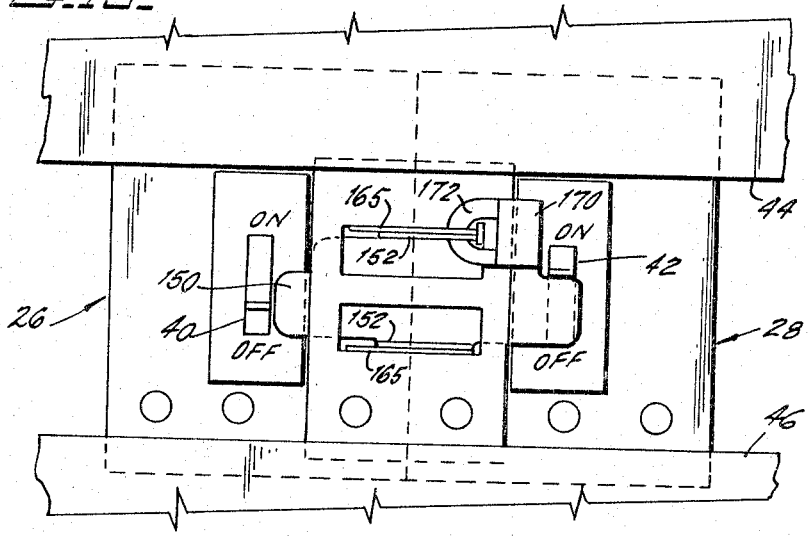
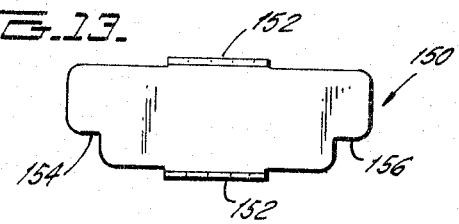
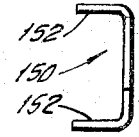
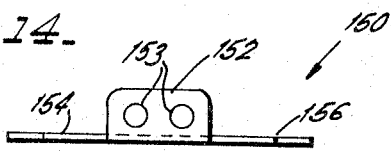
INVENTOR.
HOWARD R. SHAFFER
BY
OSTROLENK, FABER, GERB & SOFFEN
ATTORNEYS May 9, 1967
H. R. SHAFFER
3,319,020
HANDLE INTERLOCK FOR ELECTRICAL SWITCHING DEVICES
Filed May 23, 1966
4 Sheets-Sheet 3
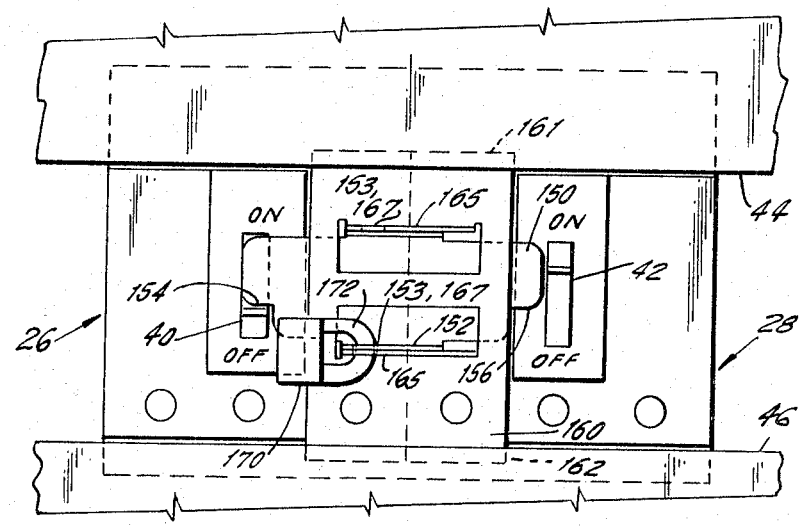
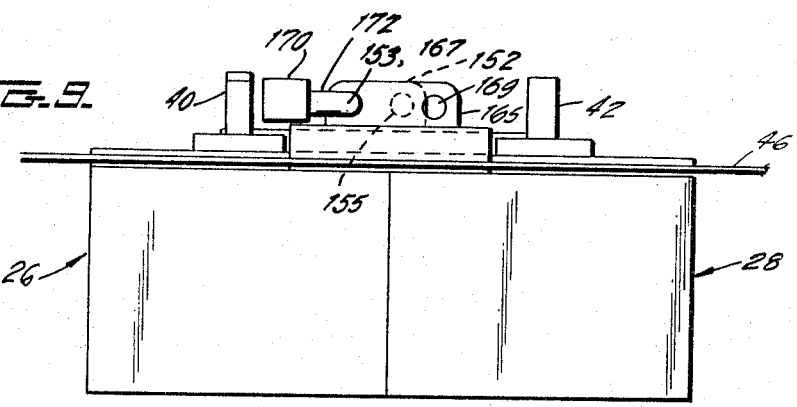
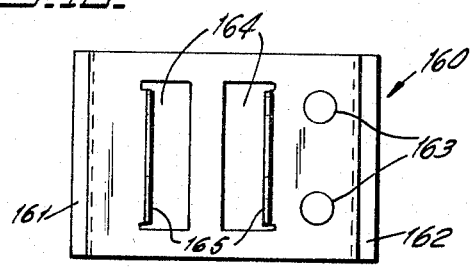
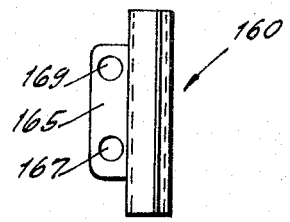
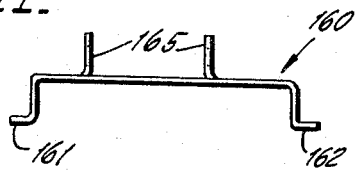
INVENTOR.
HOWARD R. SHAFFER
BY
OSTROLENK, FABER, GERB & SOFFEN
ATTORNEYS

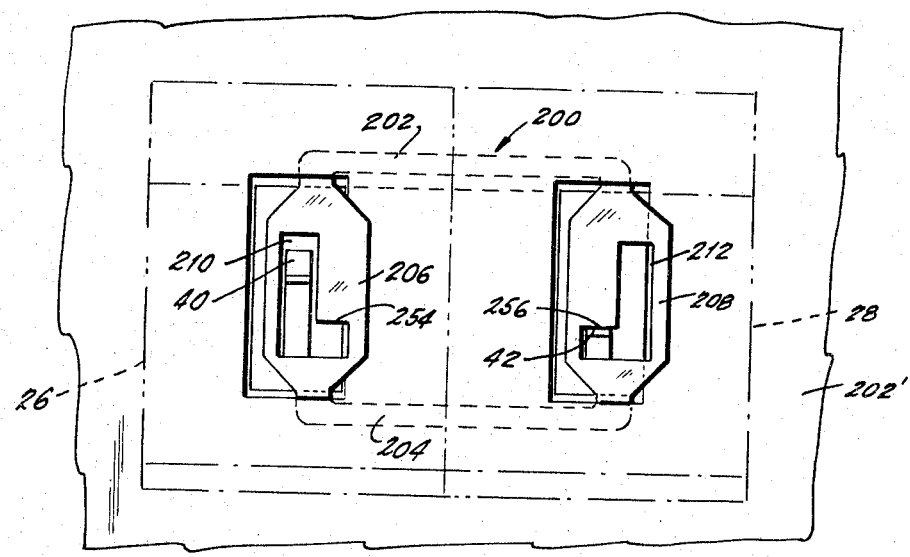
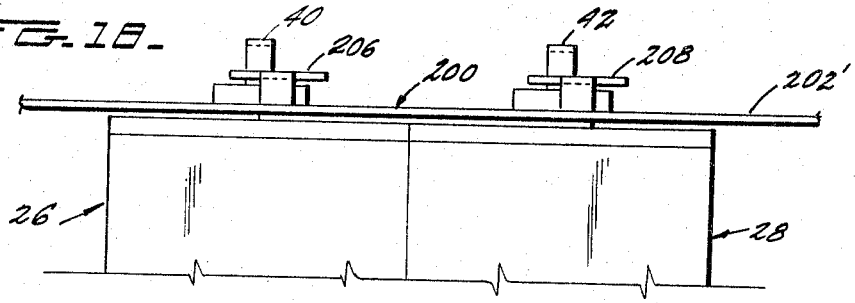
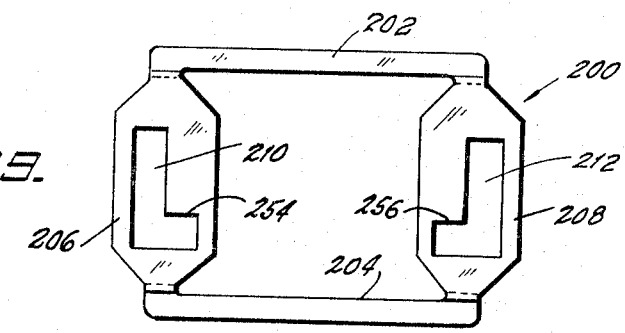
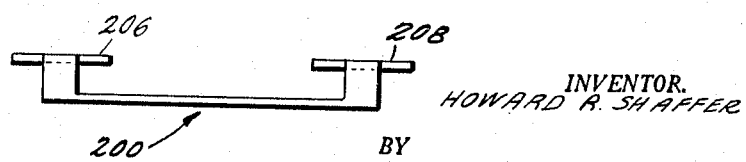

United States Patent Office 3,319,020
Patented May 9, 1967

3,319,020
HANDLE INTERLOCK FOR ELECTRICAL
SWITCHING DEVICES
Howard R. Shaffer, Glenside, Pa., assignor to I-T-E
Circuit Breaker Company, Philadelphia, Pa., a corporation of Pennsylvania
Filed May 23, 1966, Ser. No. 552,030
10 Claims. (Cl. 200—50)

My invention relates to a handle interlock, which operates in conjunction with the manual operating handles of electrical switching devices to achieve predetermined coordination of their operative positions.

More particularly, my invention may be used to coordinate the operation of a plurality of circuit breaker devices, each having a manual operating handle movable between an ON and OFF condition, such that the movement of one of the circuit breaker handles is restricted, in accordance with the position of another one of the circuit breaker handles.

Oftentimes it is required to inter-relate the operation of a plurality of electrical switching devices, such that the condition of one of the electrical switching devices limits the permissible condition of another one of the electrical switching devices. As, for example, in the protection of a plurality of circuits, by automatic circuit breaker devices, two of the circuits may be inter-related such that only one of them should be energized at any one time. That is, if the automatic circuit breaking device protecting one of the circuits is moved to the manual ON condition, means must be provided for preventing the movement of the manual operating handle of the other circuit breaker device to its ON position. Conversely, it may be desired to prevent simultaneous movement of the manual operating handles of such a pair of circuit breaker devices to the OFF condition.

My invention permits the above-mentioned types of coordinated operation by the provision of an extremely simplified interlock arrangement, which may be easily added to the mounting structures of existing circuit breaker devices. More particularly, the interlock includes a slide member, movable in the paths of operation of the circuit breaker manual operating handles. In accordance with one arrangement, the interlock slide includes an abutment surface in the path of movement of either one of a pair of circuit breaker handles, with such abutment surface serving to prevent the movement of that circuit breaker handle from its OFF condition to the ON condition. This permits one of the circuit breaker manual operating handles to be freely moved between the manual ON and OFF positions while preventing the movement of the operating handle of the other circuit breaker position out of its manual OFF position. Hence, this arrangement satisfies the condition wherein it is desired that only one of a pair of circuit breaker devices be permitted to move to the ON condition. Conversely, the slide member may be located such that it restrains the movement of one of the circuit breaker handles from its manual ON condition to the manual OFF condition, while the other circuit breaker handle is free to move between its operating condition. This latter arrangement satisfies the condition where only one of a pair of circuit breaker devices may be moved to the manual OFF condition.

In the various forms of my invention, the slide member may advantageously be mounted to the circuit breaker housing by virtue of the face plate of the panelboard into which such circuit breaker devices are conventionally placed and mounted. This may be provided by the simple expedient of a bracket means, mounted to the face plate, and containing means for receiving the slide member and guiding its movement relative to the circuit breaker handles. Where a switchboard assembly is utilized, the bracket means may be dispensed with, with the slide and its retaining structure being formed out of an integral member, maintained between the circuit breaker housing and the front cover sheet of the switchboard.

For safety of operation, it may be desired to prevent unauthorized personnel to alter the coordinated operation of the circuit breaker devices, as determined by the instant interlock device. That is, once an arrangement is provided whereby a first of a pair of circuit breaker devices is restricted to the OFF condition, with the other circuit breaker device being permitted to freely move between its ON and OFF condition, a variation of this arrangement should only be permitted by authorized personnel. In accordance with a further advantageous aspect of my invention, means may be provided within the interlock arrangement for receiving a padlock for maintaining the desired coordination of the electrical switching devices.

It is therefore seen that a principal object of my invention is to provide an improved structure for interlocking the handles of a plurality of electrical switching devices, and coordinating the permissible movement thereof between their operative positions.

A further object of my invention is to provide a handle interlock in combination with at least a first and second circuit breaker device, for preventing the movement of the operating handle of one of said circuit breaker devices from one of its operative ON or OFF positions to the other of its operative positions, when the operating handle of the other of the circuit breaker device is in a predetermined one of its operative positions.

An additional object of my invention is to provide a handle interlock assembly for use in conjunction with a pair of circuit breaker devices, which prevents the simultaneous placement of the manual operating handles of both of said circuit breaker devices in either their ON or OFF positions.

Another object of my invention is to provide a simplified means for interlocking the handles of a pair of circuit breaker devices for preselected coordinated operation thereof, and for locking the interlock means in its preselected condition.

Still a further object of my invention is to provide a handle interlock in accordance with the above objects, which is of an extremely simplified assembly, utilizes a minimum number of parts, and may be used in conjunction with standard commercially available circuit breaker devices and panelboard enclosures thereof, without requiring any appreciable or expensive modifications.

These as well as other objects of my invention will readily become apparent upon a consideration of the following description and drawings in which:

FIGS. 3 and 4 are plan and front elevation views respectively of the bracket retaining member used in the interlock shown in FIGS. 1–3.

FIGS. 5 and 6 are plan and front elevation views respectively of the slide member which forms the other cooperating portion of the interlock assembly.

FIGS. 8 and 9 are plan and front elevation views respectively of another form of interlock assembly, generally similar to that shown in FIGS. 1–7, but having provision for the reception of a locking means.

Figure 1:
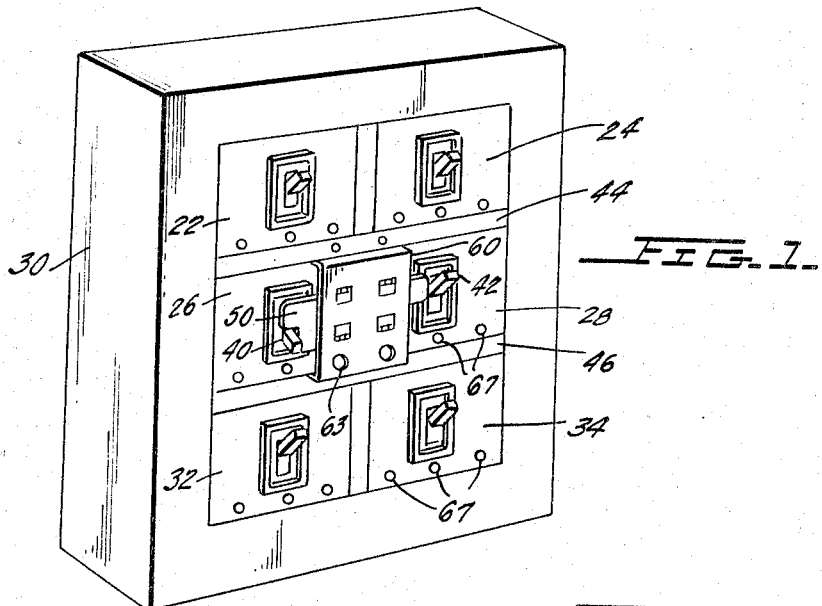
FIG. 1 is a perspective view showing one form of the handle interlock of my invention used in conjunction with circuit breaker devices mounted within a typical panelboard enclosure.

FIGS. 10, 11 and 12 are plan, front elevation and end views respectively of the bracket retaining member used in conjunction with the form of interlock shown in FIGS. 8 and 9; and FIGS. 13, 14 and 15 are plan, front elevation and end views respectively of the cooperating slide member.

FIG. 16 is a plan view corresponding to FIG. 8, but where the interlock assembly has been rearranged to permit the converse interlock condition.

FIGS. 17 and 18 are plan and front elevation views respectively of still another form of interlock constructed in accordance with my invention and utilized in conjunction with a switchboard enclosure.

FIGS. 19 and 20 are plan and front elevation views respectively of the integral interlock member, shown in the operative assembly of FIGS. 17 and 18.

Referring initially to the form of interlock assembly shown in FIGS. 1–7, a panelboard enclosure 30 is shown, which houses a multiplicity of circuit breaker devices, such as transversely adjacent circuit breaker pairs 22–24, 26–28 and 32–34. These circuit breakers are of a conventional, commercially available variety, as for example of the type described in U.S. Patent No. 3,155,802 entitled, "U-Shaped Cradle for Circuit Breaker," issued Nov. 3, 1964, in the name of Ernest R. Wortmann and assigned to the assignee of the instant invention. Reference is made to that patent for the details of the circuit breaker devices, which for the sake of brevity are herewith shown in general outline form. It should, however, be understood that this patent is referred to for exemplary purposes only, with the broad aspects of my interlock arrangement being capable of utilization in conjunction with numerous other frame sizes and constructions of circuit breaker devices, as well as other types of electrical switching devices, in which it is desired to have coordinated operation of the manual operating handles.

Adjacent circuit breakers 26, 28 are suitably mounted in the panelboard enclosure 30, with face panel portions 44, 46 transversely extending across the circuit breaker line and load ends. Circuit breaker devices 26, 28 include housings 36, 38, respectively, for enclosing their operating components, with manual operating handles 40, 42 outwardly extending therefrom for moving the circuit breakers between their manual ON and manual OFF conditions in the conventional manner. My novel interlock assembly includes two principal members, a slide 50 and a bracket retaining member 60. Bracket retaining member 60 includes mounting feet portions 61, 62, which are positioned intermediate the top surface of the circuit breaker housings 36, 38 and the panelboard face plate portions 44, 46. Opening 63 may preferably be provided to provide access to the circuit breaker instantaneous trip adjustment 67. Bracket retaining member 60 further includes cut-outs 64, with the material removed therefrom forming downwardly depending surfaces 65. Surfaces 65 are located within longitudinal recesses 52 of the slide member 50, and serve as a guide means for controlling the sideways movement of slide 50 in the direction of arrow 69, transverse to the movement of the circuit breaker operating handles 40, 42 between their ON and OFF conditions. Slide member 50 includes abutment surfaces 54, 56 at its opposed ends, which in accordance with the selective positioning of the slide member 50 is in the path of one or the other of the circuit breaker operating handles 40, 42, and serves to limit that handle's movement.

Figure 2:
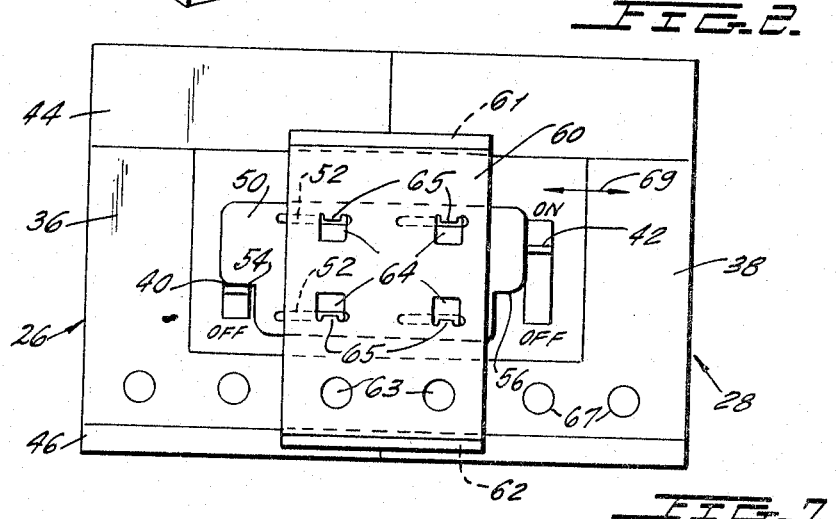
FIG. 2 is a plan view of the interlock portion of the assembly shown in FIG. 1, and wherein the interlock assembly is disposed so as to permit one at a time movement of the circuit breaker handles to the manual ON condition.

As shown in FIGS. 1 and 2, slide member 50 is positioned to the extreme left, such that bracket guide extensions 65 are in the right-hand extreme of cooperating slide slots 52. In order to so position slide 50 at its extreme left, it is necessary that the manual operating handle 40 of circuit breaker 26 be moved downward, as shown in FIG. 2, to its OFF position. With the slide 50 at the extreme left, the manual operating handle 42 of circuit breaker 28 may be freely moved between the ON and OFF conditions. However, abutment surface 54 of slide 50 will now prevent movement of manual operating handle 40 of the other circuit breaker 26 to the ON condition. That is, FIG. 2 corresponds to a condition where only circuit breaker 28 may be moved to the manual ON condition.

By moving operating handle 42 of circuit breaker 28 to the OFF condition, the slide member 50 may now be moved to the extreme right, such that the manual operating handle 40 of circuit breaker 26 may be freely moved between its ON and OFF condition. However, with the slide 50 in the extreme right-hand position, abutment surface 56 thereof will prevent the operating handle 42 of circuit breaker 28 from moving to the ON condition. Thus, it is seen that the interlock arrangement of FIGS. 1 and 2 may be selectively positionable such that either one, but only one, of circuit breakers 26 or 28 may be moved to the manual ON condition.

Figure 7:
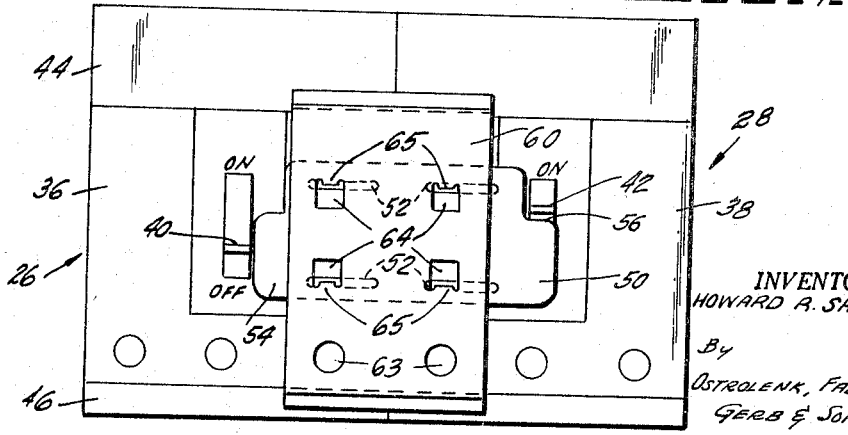
FIG. 7 is a plan view corresponding to FIG. 2, but wherein the slide member of the interlock assembly has been rearranged to permit the converse condition of allowing only one at a time movement of the circuit breaker handles to the manual OFF condition.

FIG. 7 shows an interlock assembly, utilizing the same part as shown in FIGS. 1–6, but wherein slide member 50 has been turned about in such a manner that the respective abutment surfaces 54, 56 restrain movement of the circuit breaker operating handle from the ON condition to the OFF condition, with there being adequate provision to permit the handles when so restrained to move to the trip condition, in the event of a circuit breaker overload.

As shown in FIG. 7, slide 50 is to the extreme right, thereby restraining movement of operating handle 42 of circuit breaker 28 to its ON condition, but permitting movement of manual operating handle 40 of the other circuit breaker between its operating conditions. Conversely, slide 50 may be moved to the left, with circuit breaker handle 40 being restrained from moving out of its manual ON condition to its manual OFF condition, and manual operating handle 42 of circuit breaker 28 being free to move between manual ON and manual OFF. Thus, the arrangement of FIG. 7 corresponds to an interlock in which either one but only one of circuit breakers 26, 28 may be moved to the manual OFF condition.

Reference is now made to FIGS. 8–16, which show another form of interlock arrangement constructed in accordance with my invention, and further including provision for receiving a locking means. The interlock of this embodiment includes a slide member 150 and a bracket retaining member 160, generally corresponding in function to members 50, 60 of the previous embodiment. Bracket 160 includes mounting feet 161, 162, instantaneous trip access apertures 163, and cut-outs 164, having upwardly extending portions 165. Upturned extensions 165 include apertures 167, 169 respectively. Cooperating slide member 150 includes upturned portions 152 which enter cut-outs 164 and upwardly extend therethrough in juxtaposition to bracket extension 165. Upturned portions 152 also include apertures 153, 155. Slide 150 further includes abutment surfaces 154, 156, generally corresponding in function to abutment surfaces 54, 56 of the previously discussed embodiment of FIGS. 1–7. In FIG. 8, slide member 150 is shown in position such that upturned portion 152 thereof is at the leftmost region of bracket cut-outs 164, and apertures 153 of the slide upturned portion 152 will be in alignment with apertures 167 of the bracket extension. With the slide member 150 so positioned, the coordinated condition corresponds to that shown in FIG. 1. That is, the operating handle 42 of circuit breaker 28 is free to move between its manual OFF and ON conditions, while the operating handle 40 of circuit breaker 26 is prevented from moving out of its manual OFF condition. In order to maintain this condition, a lock 170 is provided, the hasp 172 of which passes through aligned slide and bracket apertures 153, 167 respectively, of at least one of the pair of cooperating upturned members 152, 165. In many applications, for increased safety of operation, it is desired that two locks be provided. This may be achieved by another lock (not shown) placed between the cooperating apertures 153, 167 of the other pair of upturned members 152, 165.

It should naturally be understood that should it be desired to restrain the operating handle 42 of circuit breaker 28 in the OFF condition, with the operating handle 40 of circuit breaker 26 being permitted to move to the ON condition, lock 170 is released and slide 150 moved to the right, such that surface 156 will be abuttingly positioned in the path of travel of the manual operating handle 42. The interlock may now be maintained in this position by lock 170, being located within cooperating aligned apertures 155, 169 of the slide member and bracket upturned extensions respectively. Advantageously, interlock members 150 and 160 are constructed such that by changing the relative position of the slide as shown in FIG. 16, one of the circuit breaker handles is restrained in the manual ON position, while the other circuit breaker handle is permitted to move between its respective manual operating positions, thereby providing the condition previously shown in FIG. 7.

Reference is now made to FIGS. 17–20, which show another form of my invention, using an integral member 200 slidably retained between the front cover sheet 202 of a switchboard and the top surface of the circuit breakers 26, 28 respectively. Integral member 200 includes a spaced pair of arms 202, 204, which serve to retain said member, extending between the circuit breaker housings. Upward portions 206, 208 are provided at the opposed ends of member 200, and include generally L-shaped cut-outs 210, 212, respectively. As shown in FIGS. 17 and 18, member 200 is to the extreme right, such that circuit breaker handle 40 may be freely moved between its ON and OFF conditions. However, circuit breaker handle 42 will be adjacent abutment surface 256 of cut-out 212, which serves to prevent movement thereof from its OFF condition to the ON condition. Alternatively, should handle 40 be moved to the circuit breaker OFF condition, and member 200 moved to the extreme left, handle 40 of circuit breaker 26 will then be prevented by abutment surface 254 from moving out of the circuit breaker OFF condition, while handle 42 of circuit breaker 28 may be moved between its operative positions. It is thus seen that the arrangement of FIG. 17 permits either one but only one of circuit breakers 32, 34 to be moved to the ON condition. It should be naturally understood that the cut-out configurations 210, 212 may be modified so as to conversely permit movement of only one of the circuit breakers to the OFF position.

It is therefore seen that my invention provides an extremely simplified interlock arrangement, for coordinating the movement of the manual operating handles of electrical switching devices, such as circuit breakers. Advantageously, the interlock is constructed of a minimum number of parts, and may be simply added to existing circuit breaker frame sizes and mounting structures without necessitating costly or time-consuming modification.

Although there have been described preferred embodiments of this novel invention, many variations and modifications will now be apparent to those skilled in the art. Therefore, this invention is to be limited not by the specific disclosure herein, but only by the appended claims.

The embodiments of the invention in which an exclusive privilege or property is claimed are defined as follows:

1. In combination with at least a first and second electrical switching device, each including a housing having a planar front surface and a manual operating handle outwardly extending therefrom;

said manual operating handle movable in a first direction between first and second operative positions;

a handle interlock extending between said housings and selectively positionable in the paths of movements of said operating handles;

said handle interlock consisting solely of a mounting means and a slide means;

said mounting means retaining said slide means for slidable movement along the planar housing front surfaces in a second direction generally perpendicular to said first direction;

said slide means including abutment means for preventing movement of the operating handle of one of said electrical switching devices from one of its operative positions to the other of its operative positions when the operating handle of the other of said electrical switching devices is in a predetermined operative position.

2. In the combination as set forth in claim 1:

said electrical switching devices being circuit breakers;

said first and second operative positions corresponding to circuit breaker ON and OFF conditions, respectively;

said slide means including a portion positionable at a first location to permit the manual operating handle of one of said circuit breakers to be moved to the ON condition, said member when at said first location preventing movement of the manual operating handle of the other of said circuit breakers to its ON condition.

3. In a combination as set forth in claim 1:

said electrical switching devices being circuit breakers;

said first and second operative positions corresponding to circuit breaker ON and OFF conditions, respectively;

said slide means including a portion positionable at a first location to permit the manual operating handle of one of said circuit breakers being in the OFF condition, said member when at said first location preventing movement of the manual operating handle of the other of said circuit breakers to its OFF condition.

4. In a combination as set forth in claim 1:

said electrical switching devices being circuit breakers;

said first and second operative positions corresponding to circuit breaker ON and OFF conditions, respectively;

said slide means including portions positionable to permit the manual operating handle of either one of said circuit breakers to move into one of its operative positions and when so positioned preventing the manual operating handle of the other of said circuit breakers from moving into said one operative position.

5. In a combination as set forth in claim 1:

said electrical switching devices being circuit breakers;

said slide means movable between a first position in which the manual operating handle of said first circuit breaker is freely movable between its first and second operative positions and a first abutment surface of said slide is in the path of movement of the manual operating handle of said second circuit breaker for preventing movement thereof from one of its operative positions to the other of its operative positions, and a second position in which the operating handle of said second circuit breakers is freely movable between its first and second operative positions and a second abutment surface of said slide is in the path of movement of the manual operating handle of said first circuit breaker for preventing movement thereof from one of its operative positions to the other of its operative positions.

6. In a combination as set forth in claim 5:

said first and second circuit breaker operative positions corresponding to circuit breaker ON and OFF conditions, respectively;

said slide means when in said first operative position preventing movement of the operating handle of said second circuit breaker from its ON condition to its OFF condition, and when in said second operative position preventing movement of the operating handle of said first circuit breaker from its ON condition to its OFF condition, such that only one of said circuit breakers may be moved to the OFF condition.

7. In a combination as set forth in claim 5:

said first and second circuit breaker operative positions corresponding to circuit breaker ON and OFF conditions, respectively;

said slide means when in said first operative position preventing movement of the operating handle of said second circuit breaker from its OFF condition to its ON condition, and when in said second operative position presenting movement of the operating handle of said first circuit breaker from its OFF condition to its ON condition, such that only one of said circuit breakers may be moved to the ON condition.

8. In combination with at least a first and second electrical switching device, each including a housing and a manual operating handle outwardly extending therefrom;

said manual operating handle movable between first and second operative positions;

a handle interlock extending between said housings and selectively positionable in the paths of movement of said operating handles;

said handle interlock including means for preventing movement of the operating handle of one of said electrical switching devices from one of its operative positions to the other of its operative positions when the operating handle of the other of said electrical switching devices is in a predetermined operative position;

said electrical switching devices being circuit breakers;

said circuit breakers positioned such that said manual operating handles are each moved in a first direction between their first and second operative positions;

said interlock means including a slide movable in a second direction, transverse to said first direction;

said slide movable between a first position in which the manual operating handle of said first circuit breaker is freely movable between its first and second operative positions and a first abutment surface of said slide is in the path of movement of the manual operating handle of said second circuit breaker for preventing movement thereof from one of its operative positions to the other of its operative positions, and a second position in which the operating handle of said second circuit breakers is freely movable between its first and second operative positions and a second abutment surface of said slide is in the path of movement of the manual operating handle of said first circuit breaker for preventing movement thereof from one of its operative positions to the other of its opertaive positions;

said slide including means for receiving a lock and locking said side in a selectable one of said first or second positions.

9. In combination with at least a first and second electrical switching device, each including a housing and a manual operating handle outwardly extending therefrom;

said manual operating handle movable between first and second operative positions;

a handle interlock extending between said housings and selectively positionable in the paths of movement of said operating handles;

said handle interlock including means for preventing movement of the operating handle of one of said electrical switching devices from one of its operative positions to the other of its operative positions when the operating handle of the other of said electrical switching devices is in a predetermined operative position;

said electrical switching devices being circuit breakers;

said circuit breakers positioned such that said manual operating handles are each moved in a first direction between their first and second operative positions;

said interlock means including a slide movable in a second direction, transverse to said first direction;

said slide movable between a first position in which the manual operating handle of said first circuit breaker is freely movable between its first and second operative positions and a first abutment surface of said slide is in the path of movement of the manual operating handle of said second circuit breaker for preventing movement thereof from one of its operative positions to the other of its operative positions, and a second position in which the operating handle of said second circuit breakers is freely movable between its first and second operative positions and a second abutment surface of said slide is in the path of movement of the manual operating handle of said first circuit breaker for preventing movement thereof from one of its operative positions to the other of its operative positions;

further including means for guiding the movement of said slide in said second direction, between said first and second positions.

10. In combination with at least a first and second electrical switching device, each including a housing and a manual operating handle outwardly extending therefrom;

said manual operating handle movable between first and second operative positions;

a handle interlock extending between said housings and selectively positionable in the paths of movement of said operating handles;

said handle interlock including means for preventing movement of the operating handle of one of said electrical switching devices from one of its operative positions to the other of its operative positions when the operating handle of the other of said electrical switching devices is in a predetermined operative position;

said first and second circuit breaker operative positions corresponding to circuit breaker ON and OFF conditions, respectively;

said circuit breakers positioned such that said manual operating handles are each moved in a first direction between their ON and OFF conditions;

said interlock means including a slide movable in a second direction, transverse to said first direction;

said slide including a first and second planar surface and positionable such that either of said surfaces is in juxtaposition with respect to the forward surface of said circuit breaker devices;

said slide including first and second abutment surfaces at the opposed ends thereof;

said slide having first and second positions when said first planar surface is in juxtaposition to said circuit breaker forward surfaces, and third and fourth positions when said second planar surface is in juxtaposition to said circuit breaker forward surface;

said slide when in said first position locating said first abutment surface in the path of travel of said first circuit breaker manual operating handle for preventing movement thereof from its OFF condition to its ON condition, and when in said second position locating said second abutment surface in the path of travel of said second circuit breaker manual operating handle for preventing movement thereof from its OFF condition to its ON condition;

said slide when in said third position locating said second abutment surface in the path of travel of said first circuit breaker manual operating handle for preventing movement thereof from its ON condition to its OFF condition, and when in said fourth position locating said first abutment surface in the path of travel of said second circuit breaker manual operating handle for preventing movement thereof from its ON condition to its OFF condition;

such that said first and second positions prevent movement of one of said circuit breaker manual operating handles from the ON condition, and said third and fourth positions prevent movement of one of said circuit breaker manual operating handles to the OFF condition.

References Cited by the Examiner
UNITED STATES PATENTS

| | | | |
|---|---|---|---|
| 2,348,107 | 5/1944 | Brongersma | 200—50.3 X |
| 2,557,351 | 6/1951 | Jacobson | 200—50.3 X |
| 3,196,227 | 7/1965 | Carter et al. | 200—50.3 |

ROBERT K. SCHAEFER, *Primary Examiner.*

R. S. MACON, *Examiner.*

J. R. SCOTT, *Assistant Examiner.*

Disclaimer 3,319,020.—*Howard R. Shaffer*, Glenside, Pa., HANDLE INTERLOCK FOR ELECTRICAL SWITCHING DEVICES. Patent dated May 9, 1967. Disclaimer filed Apr. 1, 1969, by the assignee, *I-T-E Imperial Corporation*.

Hereby enters this disclaimer to claims 1, 2, 4, 5, 7, 8 and 9 of said patent.
[*Official Gazette September 23, 1969.*]